United States Patent [19]

Cammann et al.

[11] Patent Number: 4,476,368

[45] Date of Patent: Oct. 9, 1984

[54] INNER WALL TUBE DISINTEGRATOR

[75] Inventors: Fred W. Cammann, Rocky River; John Nester, North Olmsted; Jere H. Roach, Rocky River, all of Ohio

[73] Assignee: Cammann Manufacturing Company, Inc., Bay Village, Ohio

[21] Appl. No.: 320,208

[22] Filed: Nov. 12, 1981

Related U.S. Application Data

[63] Continuation-in-part of Ser. No. 234,707, Feb. 17, 1981, abandoned.

[51] Int. Cl.³ ............................................. B23P 1/02
[52] U.S. Cl. ............................. 219/69 V; 219/69 E; 219/69 G
[58] Field of Search ............... 219/69 M, 69 V, 69 R, 219/69 G, 68, 59.1, 60 A, 66, 61, 69 E; 228/45

[56] References Cited

U.S. PATENT DOCUMENTS

| | | | |
|---|---|---|---|
| 2,942,092 | 6/1960 | Cammann | 219/69 V |
| 3,053,966 | 9/1962 | Landis et al. | 219/69 V |
| 3,873,700 | 3/1975 | Brettrager | 219/69 E |
| 3,995,134 | 11/1976 | Dudden | 219/69 E |
| 4,068,791 | 1/1978 | Scholtus et al. | 228/45 |
| 4,293,918 | 5/1980 | Schneider | 219/69 V |
| 4,374,313 | 2/1983 | Mateja et al. | 219/69 M |

Primary Examiner—B. A. Reynolds
Assistant Examiner—Alfred S. Keve
Attorney, Agent, or Firm—Pearne, Gordon, Sessions, McCoy, Granger & Tilberry

[57] ABSTRACT

A metal tube wall disintegrator is convertible in being able to disintegrate an arcuate or annular portion on the inner wall of the metal tube or to disintegrate merely one longitudinally extending portion on the inner wall of the tube. In the arcuate disintegrating mode, the disintegrator uses an electrode which is rotated at the end of a flexible cable inside the tube at a selected longitudinal position to be able to disintegrate or cut partially or completely through the tube wall. A first drive means rotates the flexible cable and electrode, and a second drive means rotates an outer tubular sheath of the flexible cable. This tubular sheath rotates a guide tip at the forward end of the outer sheath and the guide tip has a radially elongated, eccentric slot through which the electrode shaft extends. This permits a slow rotation of the eccentric slot so that the electrode disintegrator arc moves in an arcuate path around the inner tube wall. In the second mode, control means stops the rotation of the guide tip and a longitudinally elongated electrode is used to disintegrate an area at only one peripheral position in the inner tube wall, this disintegrator area having a longitudinal length greater than the lateral dimension thereof. This permits a tube wall to be disintegrated completely through, or nearly through, at this one peripheral position so that the tube may be relaxed, and hence capable of being withdrawn from a boiler tube sheet in which the tube has been confined. The foregoing abstract is merely a resume of one general application, is not a complete discussion of all principles of operation or applications, and is not to be construed as a limitation on the scope of the claimed subject matter.

33 Claims, 13 Drawing Figures

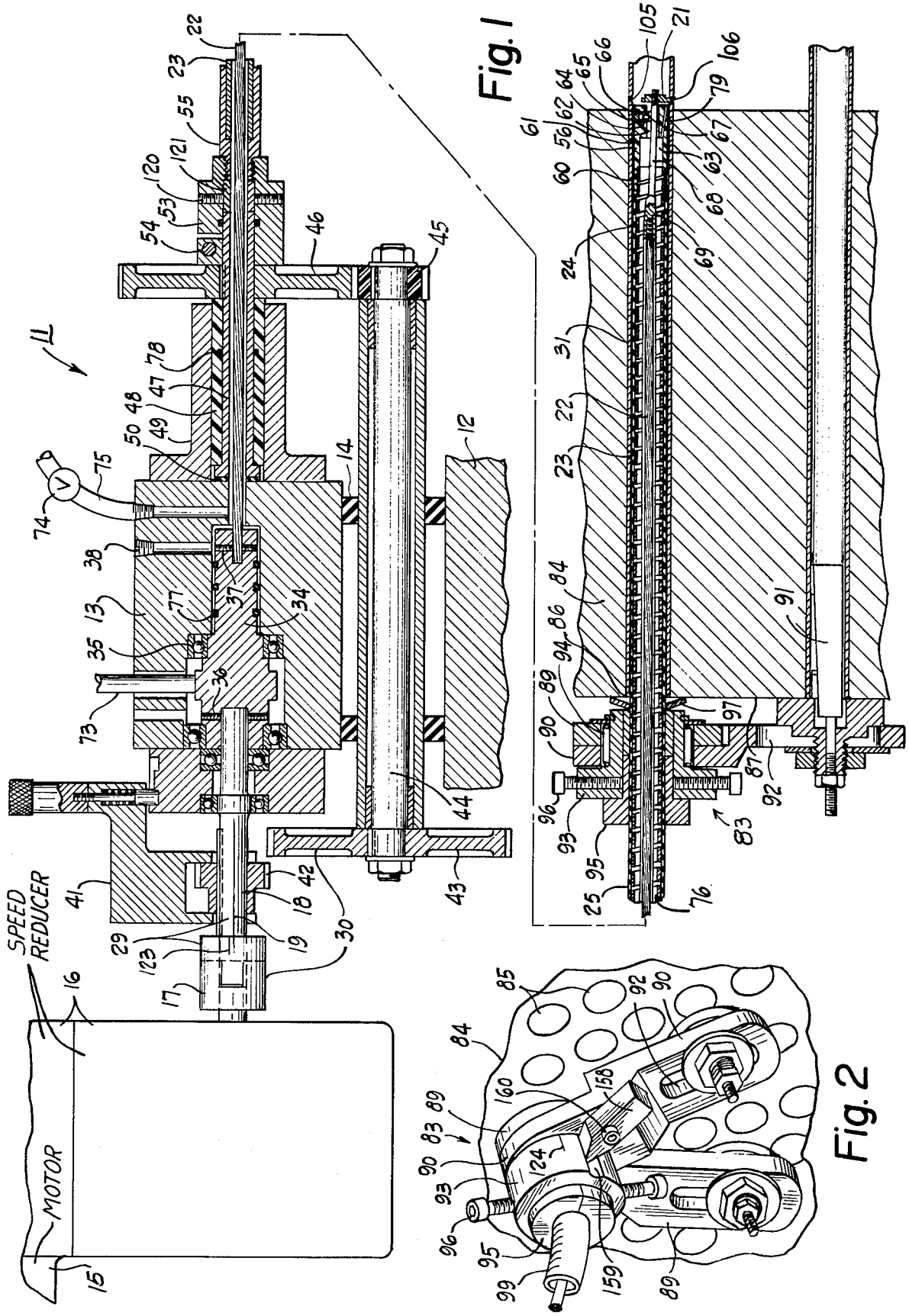

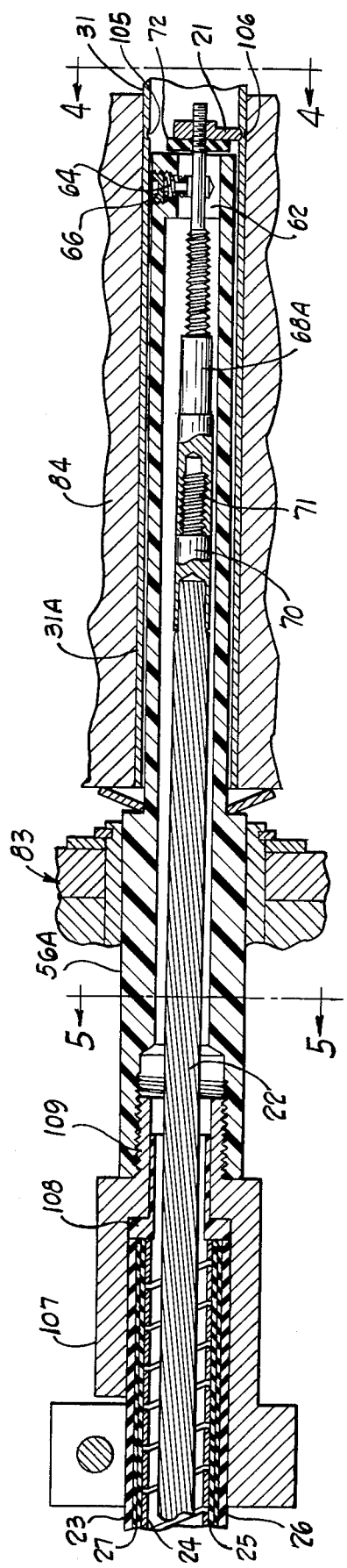
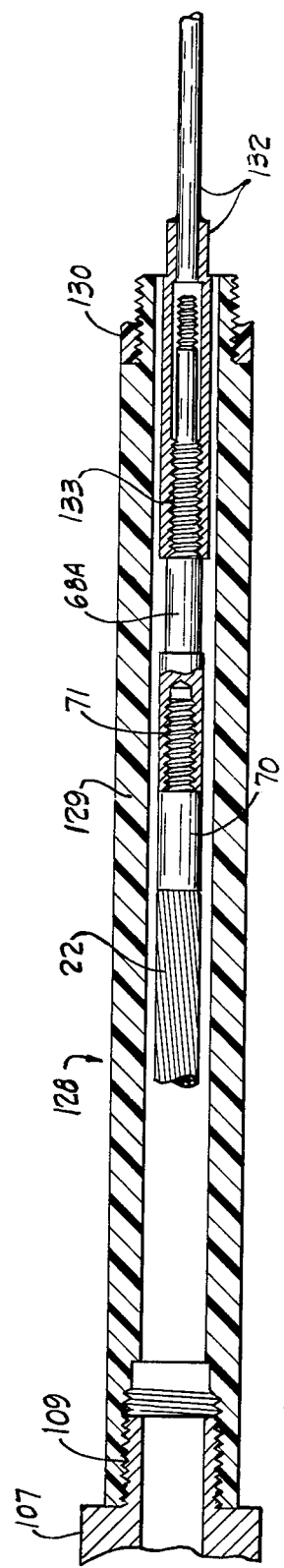
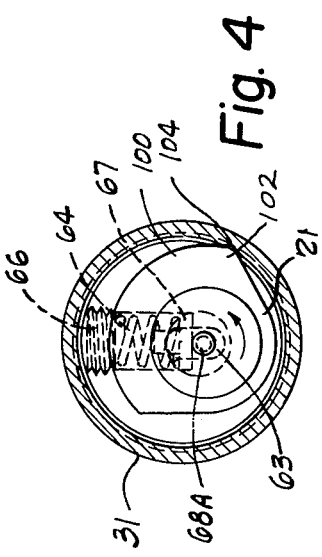
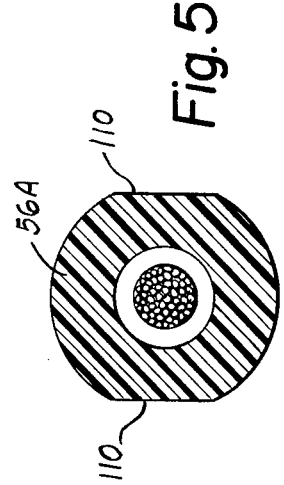
Fig. 3
Fig. 4
Fig. 6
Fig. 5

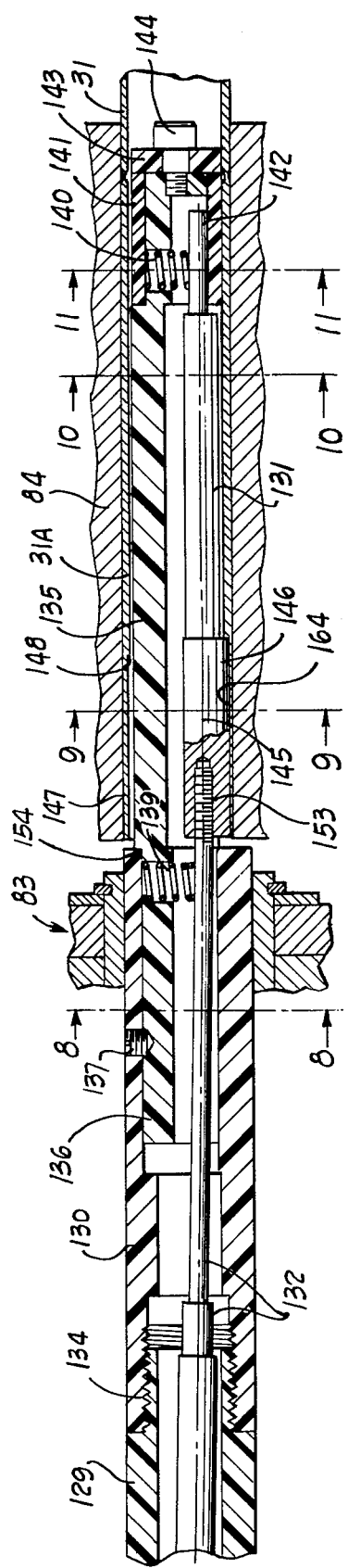
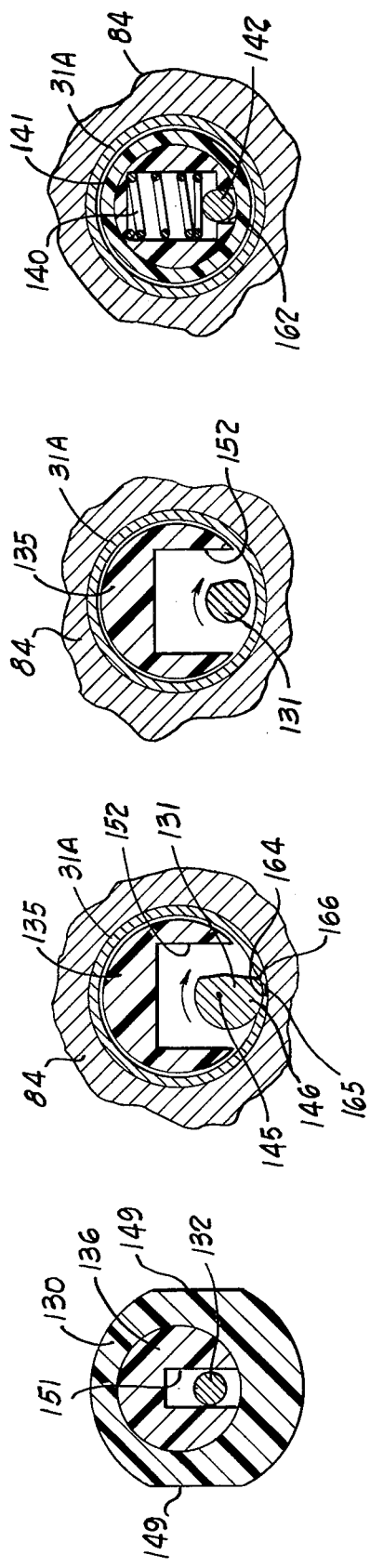
Fig. 7
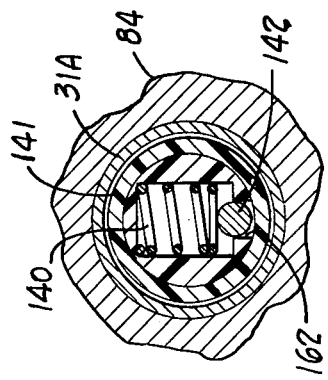
Fig. 11
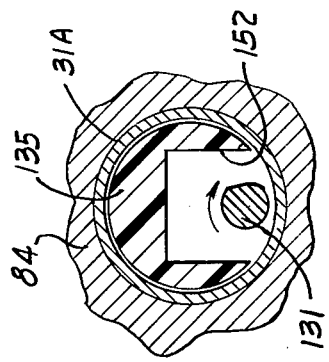
Fig. 10
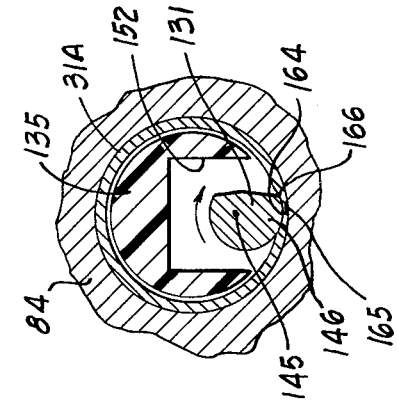
Fig. 9
Fig. 8

INNER WALL TUBE DISINTEGRATOR

BACKGROUND OF THE INVENTION

This application is a continuation-in-part application of copending application Ser. No. 234,707, filed Feb. 17, 1981, now abandoned.

Internal tube cutters have been known in the prior art which utilized a rotary cutting tool to physically remove metal from an arcuate path in the interior of the tube. It has also been known in the prior art, as in U.S. Pat. No. 2,942,092, to have a rotating cutter wheel which was mounted eccentrically on the end of a flexible shaft so that the eccentric weight and centrifugal force caused this cutter wheel to swing outwardly into contact with the interior of a conductive tube along an annular path as the cutter rotated. An electrical disintegrator current was also applied between the rotating cutter and the tube to help disintegrate the tube by disintegrator arcing.

It further has been known in the prior art to utilize a disintegrator arc in connection with an axially vibrating electrode and axially forward slow feed to disintegrate a workpiece. This workpiece might be a broken tap deep within a hole in a metal body, for example, and might be as shown in U.S. Pat. No. 3,833,785.

The difficulty with the structure shown in the first-mentioned patent was that there was uncontrolled movement of the electrode wheel as it rotated inside the tube, the eccentric weight of such electrode causing uncontrolled bouncing off the internal wall of the tube, and hence uncontrolled position of the disintegrator arc. Oftentimes, the tube disintegrated more rapidly on one side, e.g., the lower side of the tube, than at the upper side. The difficulty with the structure shown in the second-mentioned patent was that the arcing took place primarily along the axially forward end of the electrode so as to burn away metal parts which were axially disposed, but such a mechanism could not be effectively used to burn away a part of a tube wall radially disposed relative to the outer end of the electrode. Accordingly, it was not known how to use such mechanism for cutting an arcuate slot through a tube wall or for actually severing the tube into two parts by a circular cut. Further, it was not known how to use this disintegrator mechanism for relaxing a tube which had been expanded radially outwardly into a confined outer support member, and it was not known how to use such disintegrator mechanism for disintegrating a longitudinally elongated area in only a single peripheral location on the inner wall of the tube.

FIELD OF THE INVENTION

The problem to be solved, accordingly, is how to utilize a disintegrator arc to cut through the wall of a tube from the inside of the tube, especially where the exterior surface of the tube is not available on which to work. This problem is especially acute with respect to a nuclear reactor heat exchanger, for example, where the possibility of radioactive contaminants makes it extremely difficult to perform any repair operations on the heat exchanger.

The problem to be solved also is how to utilize a disintegrator to make an annular cut to sever a tube into two portions, and then how to use the same disintegrator machine to disintegrate an elongated area in one peripheral portion so that the previously expanded tube may be relaxed and the entire tube section removed from a previously tightly confining outer support.

The problem is solved by an inner wall tube disintegrator comprising, in combination, a frame, support means on said frame adapted to be longitudinally fixed relative to a tube having a portion to be disintegrated, mounting means for mounting a disintegrator electrode relative to said support means and adapted to have the electrode positioned within the tube, means to relatively insulate said electrode mounting means from said tube, means to supply disintegrator current to said electrode mounting means relative to the tube for disintegrator arcing between the tube and the electrode, drive means to establish motion of the electrode laterally toward and away from the inner wall of the tube to intermittently draw disintegrator arcs between the electrode and the inner wall of the tube, and means for restricting said intermittent motion to a given transverse path to have the electrode engage the inner wall of the tube at substantially only one peripheral disintegrator area.

The problem is further solved by a convertible type internal disintegrator for a metal tube inner wall comprising, in combination, a frame, support means on said frame adapted to be longitudinally fixed relative to a tube having a portion to be disintegrated, means for mounting a disintegrator electrode relative to said support means with the electrode adapted to be positioned within the tube, means to relatively insulate said electrode mounting means from the tube, means to supply disintegrator current to said electrode mounting means relative to the tube for disintegrator arcing between the electrode and the tube inner wall, first drive means to establish a first motion of said electrode mounting means relative to said support means whereby an electrode in said electrode mounting means has a first motion alternately toward and away from the inner wall of any said tube to draw disintegrator arcs between the electrode and the tube inner wall, second drive means cooperable with said first drive means to cause the electrode mounting means to have a second motion adapted to cause the disintegrator arcs to have an arcuate movement along the inner wall of the tube, and control means operable alternatively to one of said first and second drive means and cooperable with the other of said first and second drive means to cause the electrode mounting means to have a feed motion in one peripheral area on the tube inner wall, whereby the electrode arc disintegrates an area on the tube inner wall which has a longitudinal length greater than the peripheral extent thereof.

Accordingly, an object of the invention is to provide a disintegrator machine which will cut an elongated area on the inner wall of a conductive tube.

Another object of the invention is to provide a convertible machine which will cut either an annular path or a longitudinally elongated area on the inner wall of the tube.

A further object of the invention is to provide a tube inner wall disintegrator which will operate remotely and will operate in contaminated environments.

Other objects and a fuller understanding of the invention may be had by referring to the following description and claims, taken in conjunction with the accompanying drawings.

BRIEF DESCRIPTION OF THE DRAWINGS

FIG. 1 is a longitudinal, sectional view of most of the parts of an inner wall tube disintegrator according to the invention;

FIG. 2 is a perspective view of a flexible shaft support;

FIG. 3 is an enlarged, longitudinal, sectional view of a modified disintegrator electrode used with FIG. 1;

FIG. 4 is a sectional view on line 4—4 of FIG. 3, but with the electrode rotated to a different position;

FIG. 5 is a sectional view on the line 5—5 of FIG. 3;

FIG. 6 is an enlarged longitudinal, sectional view of an alternatively used tube relaxer extension;

FIG. 7 is an enlarged, longitudinal, sectional view of a relaxer guide used with the relaxer extension of FIG. 5;

FIG. 8 is an enlarged sectional view on line 8—8 of FIG. 7;

FIG. 9 is an enlarged sectional view on line 9—9 of FIG. 7;

FIG. 10 is an enlarged sectional view on line 10—10 of FIG. 7;

FIG. 11 is an enlarged sectional view on line 11—11 of FIG. 7.

DESCRIPTION OF THE PREFERRED EMBODIMENTS

Figure 12:
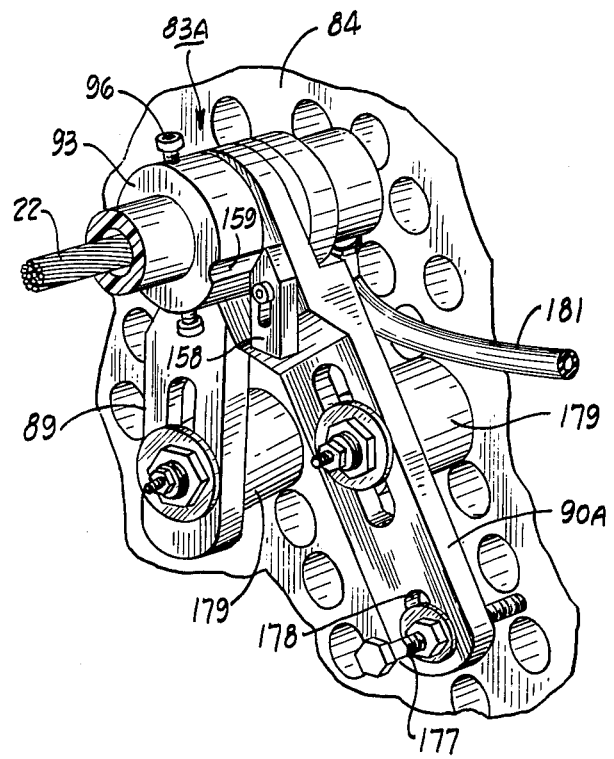
FIG. 12 is a perspective view of a modified flexible shaft support.

FIGS. 1 and 2 illustrate an inner wall tube disintegrator 11 having a base 12 with a body 13 of metal carried by insulating supports 14 from the base 12. The disintegrator 11 includes a motor 15 and a variable speed reducing unit 16 driving through an insulated coupling 17 to a shaft 18 journaled along the axis 19 of the body 13. The disintegrator 11 includes a disintegrator electrode 21. In order that this electrode may be remote from and remotely controlled by the disintegrator 11, the electrode 21 is connected to be driven by a first flexible shaft 22 which, at the body 13, is coaxial with the axis 19 and which is disposed inside of a hollow second flexible shaft 23. In this preferred embodiment, the first flexible shaft 22 is a stranded steel cable. The second flexible shaft 23 is one with multiple layers including a helical, flat steel spring 24 covered with a first rubber layer 25, a fabric braid 27, and a second rubber layer 26.

First drive means 29 is provided to move the electrode relative to the base 12, and this is to establish a first motion of the electrode toward and away from any said tube 31 to periodically draw disintegrator arcs between the electrode and any said tube. This first drive means includes the motor 15, the speed reducer 16, and a connection (described below) from the input shaft 18 to the first flexible shaft 22. Second drive means 30 is provided to establish a second motion of the electrode 21 to cause the disintegrator arcs to move in a given arcuate path. This may be only a small arc of a circle, or it may be a complete circular arc to cut the tube 31 into two longitudinally separate pieces. This second drive means 30 again includes the motor 15 and speed reducer 16, plus another drive connection described below, to rotate the second hollow, flexible shaft 23 at a rotational speed which is slow relative to the speed of rotation of the first flexible shaft 22. This second drive means moves the point of disintegrator arcing between the electrode 21 and the tube 31 in a given arcuate path.

The body 13 has a conductive rotor 34, for example, of copper, journaled by bearings 35 along the axis 19. The shaft 18 is secured to this conductive rotor 34 by setscrews 36. Other setscrews 37 secure the proximal end of the first flexible shaft 22 in a coaxial aperture in the conductive rotor 34. Access to the setscrews 37 is achieved through a removable plug 38. The parts 34, 36, and 37 thus form a part of the first drive means to act through the first flexible shaft 22 to rotate the electrode 21.

The second drive means 30 includes a dog clutch 41 connected to move a pinion gear 42 keyed to the shaft 18, and when the clutch 41 is moved to the right, as viewed in FIG. 1, the pinion 42 meshes with a gear 43 fixed on a jack shaft 44. This jack shaft is journaled relative to the body 13, and at the end thereof has fixed thereon an insulating pinion 45 which meshes with a gear 46 keyed to a metal sleeve 47. This metal sleeve is journaled inside an insulating sleeve 48, such as one made of nylon, which in turn is press-fitted into a tubular support 49 secured by means (not shown) on the end of the body 13. An insulating thrust washer 50 is disposed at the left end of the metal sleeve 47 between a flanged head thereon and the body 13. By the two gear reductions of the gears 42, 43, 45, and 46, the metal sleeve 47 is rotated at a speed considerably slower than that of the first flexible shaft 22.

A compressible fitting 53 is secured by a bolt 54 on the outer end of the metal sleeve 47, and a metal ferrule 55 is threaded into this fitting 53. The proximal end of the second flexible shaft 23 is secured in the metal ferrule 55 in a manner similar to the way it is secured in the guide tip 56 shown in FIG. 3. By this means, the second hollow, flexible shaft 23 is rotated at a slow speed from the motor 15.

FIG. 1 shows the distal end of the two flexible shafts 22 and 23 and the guide tip 56. This guide tip is made of insulation, for example, of nylon, or higher temperature insulation such as ceramic, and is secured by a setscrew 60 to the helical steel spring 24 at the outer end of the second flexible shaft 23, whereat the outer rubber layers have been removed. This guide tip 56 has an annular radial shoulder 61 in order to provide a rotational bearing surface for the guide tip 56 within the tube 31 and also to be relatively closely received within that tube 31. As best shown in the parent case, the guide tip 56 has an elongated slot 62 extending radially, so that it has an eccentric portion 63. A spring 64 is disposed in an aperture 65 and held in place by a threaded cap 66. This spring bears against a nylon plug 67, which in turn bears against an electrode shaft 68 on which the electrode 21 is threaded. This electrode shaft 68 has an enlarged head 69 which is secured on the distal end of the first flexible shaft 22.

Electrical current for disintegrating the inner wall of the tube 31 is supplied through a brush 73 held in the metal body 13 and riding on a current collector portion of the conductor rotor 34. From here, the current passes longitudinally through the first flexible shaft 22 to the electrode 21. Means is provided to relatively insulate the electrode mounting means and tube 31, and this is provided by the insulated coupling 17 and the insulating support 14. A fluid coolant is supplied to the electrode 21, even though the electrode may be made of molybdenum, for example, which resists deterioration by the electric disintegrator arc. This fluid coolant may be a gas, such as air, nitrogen, or helium, but more often is a liquid, such as water, for example, entering through a valve 74 and a conduit 75 to the metal body 13 and to the space 76 between the first and second flexible shafts 22 and 23. O-rings 77 on the conductor rotor 34 prevent coolant leakage as do O-rings 78 between the metal sleeve 47 and insulating sleeve 48. When the coolant reaches the guide tip 56, it flows out through the radial slot 62, and also flows through diverging coolant passages 79 to be closely adjacent the area where the electrode 21 arcs relative to the tube 31.

The body 13 and base 12 may be positioned directly at the end of the tube 31 wherein an internal cut is desired. However, one prominent use for the disintegrator 11 is in steam boilers or tubular heat exchangers for nuclear reactors, whereat the possibility of contamination is very great. In such cases, remote location of the base 12 is very desirable. Accordingly, a flexible shaft support 83 is provided to support and hold fixed an intermediate portion of the second flexible shaft 23. FIG. 2 illustrates this flexible shaft support 83 as attached to a tube sheet 84. This may be a bulkhead of a boiler or heat exchanger which has a plurality of closely spaced apertures 85 receiving ends of the plurality of tubes 31. These tubes may be welded at 86 to the tube sheet at the outer surface thereof. In such boiler or heat exchanger, there would be access doors in an outer wall (not shown) in order to provide access to the outer surface 87 of this tube sheet 84.

The flexible shaft support 83 includes first and second swingable legs 89 and 90. Each leg is secured to the outer surface 87 by an expansion bolt 91 fitting within the outer end of a selected tube 31. The expansion bolt may be moved along a slot 92 in the respective leg in order to position the expansion bolt at a particular tube. The legs 89 and 90 journal a bushing 93 by means of needle bearings 94. Split semicylindrical bushings 95 are held in place by setscrews 96 to secure the second flexible cable 23 in the rotatable bushing 93 at a fixed, longitudinal position. A coolant seal 97 surrounds the second flexible shaft 23 at the outer surface 87 to prevent coolant leakage. The supply of electrical current for disintegrator arcs may be supplied by a circuit similar to that shown in U.S. Pat. No. 3,833,785, which had a tap transformer to supply a variable voltage in accordance with the impedance of the circuit to the electrode and impedance of the return current through the workpiece.

Operation

The internal tube disintegrator 11 may be used to disintegrate an arcuate cut or a complete circular cut on the internal wall of a tube 31 by the rotating electrode 21. This electrode 21 may be remotely controlled, and may be positioned around a bend in the tube 31. The base 12 is supported on some suitable support (not shown) so that the flexible shafts 22 and 23 may enter the selected tube 31 in which the cut is desired to be made. The flexible shaft support 83 would be mounted to the end of the tube 31, for example, by using the expansion bolts 91 to secure it to the tube sheet 84. This would establish the rotatable bushing 93 coaxial with the end of the desired tube 31. The second flexible shaft 23 is inserted into the desired tube 31 to the desired depth, and to this end, a cordage-type meter with rolls contacting the outer, flexible cable 23 may be utilized. Alternatively, a simpler solution would be to mark longitudinally on the second flexible shaft 23 inch or centimeter marks 99, which would give an indication of the depth of insertion of the electrode 21. The motor 15 is energized to thus rotate the first flexible shaft 22, and also the clutch 41 engaged to rotate the second flexible shaft 23, preferably at a lower speed. In one successfully operating unit according to the invention, the first flexible shaft was rotated at about 1400 r.p.m., and, through the gear reduction, the second flexible shaft 23 was rotated at about 50-70 r.p.m. The coolant water was turned on through the valve 74, and then the electric discharge current was supplied through the brush 73.

The electrode 21 has an eccentric portion 100. When electrode 21 has rotated to a position with this eccentric portion 100 disposed downwardly, and with the radial slot 62 having its eccentric portion 63 disposed downwardly, the spring 64, in addition to centrifugal force, will cause the eccentric portion 100 to engage the inner wall of the tube 31. The electrode shaft 68 will have moved downwardly to achieve this contact. When the electrode 21 has rotated counterclockwise (see FIG. 4) to a point whereat the slot 62 forces the eccentric portion 100 out of engagement with the inner wall of the tube 31, then a disintegrator arc 104 is drawn between the trailing edge 102 of the eccentric portion 100 and the inner wall of the tube 31. When the eccentric portion 100 is vertically upwardly, then even if the centrifugal force on the eccentric portion 100 overcomes the force of the spring 64, the eccentric portion 100 cannot contact the inner wall of the tube on the upper half thereof because the slot 62 is not radially enlarged in that direction. Upon further counterclockwise rotation of the electrode 21, it will again approach the bottom of the tube and will again contact this tube to provide a short circuit to the disintegrator current. Hence, there will be one arc per revolution at the trailing edge of eccentric portion 100. The exact position of this arc will depend upon the rotational speed of the electrode, the slow rotational speed of the guide tip 56, the mass of the electrode 21 as it wears away, the arcuate size of the eccentric part 100, the radial length of this eccentric part 100, the progressive depth of cut, and the stiffness of the spring 64. Nevertheless, as the guide tip 56 slowly rotates, the guide slot 62 is rotated, and hence the position of the arc changes completely around the interior of the tube 31.

FIG. 1 illustrates the tube 31 as having an annular cut portion or disintegrated portion 105, which has nearly cut through the wall of the tube 31. At this condition, a phenomenon occurs which is not fully understood, but it has been observed that the outer wall of the tube develops a concave annular depression 106 at the longitudinal position of the cut portion 105. This is apparently a shrinking of the tube, and in one tube which was 0.745 inch outside diameter, the tube shrank at the depression 106 to 0.729 inch in outside diameter just before the electrode 21 broke through to sever the tube into two parts. This shrinking can be a considerable help in many cases. For example, it could help in trying to remove the tube 31 from the interior of the tube sheet 84, wherein it is usually force-fitted or expanded initially or by use. Also, for example, the tube 31 could be cut apart at the weld 86 so that the entire tube could be removed from the tube sheet 84.

A mark 123 may be placed on the coupling 17 when the electrode trailing edge is at a certain position, e.g., the top. A mark 124 placed on the bushing 93 is aligned with the slot eccentric portion 63 at the time when the guide tip and flexible cable 23 are first inserted into the tube and clamped by the split bushing 95. This enables one to know the peripheral position of the tube at which an arcuate cut will be made. Such marks also permit positioning the electrode at the top, for example, and the slot eccentric portion 63 at the bottom, for example, so that the flexible cables may be withdrawn after the cut is made without the electrode catching on the edge of the cut.

The parent case shows a modification to permit disintegration of only an arcuate portion of the tube 31 rather than a complete annular cut through this tube. To accomplish this, the guide tip 56 is moved in a small arc rather than rotated continuously in one direction. The gears 45 and 46 are still provided and still in mesh; however, a drive pin would be removed from an aperture in the hub of the gear 45 and jack shaft 44 so that the gear 45 would not turn with the shaft 44. An eccentric is keyed to the jack shaft 44 and a crank having an arm is journaled on this eccentric. The gear 46 has a hub extension on which a leg normally rides freely. To achieve the arcuate movement, the leg is clamped to an extension of the hub having first set the position of mark 124 to the desired arcuate position. This leg has a slot and the arm has a pivot bolt through an aperture in the arm and through the slot 116. By adjusting the position of the pivot bolt along the slot, the amount of crank throw of the leg can be adjusted. By this means, the large gear 46 is given a small arcuate movement of an adjustable amount. This arcuately moves the second flexible shaft 23 back and forth so that the point of application of the disintegrator arc changes. Alternatively, the clutch 41 may be disengaged, and the gear 46 arcuately moved by another drive, or by hand. In this way, only a small arcuate cut may be made in the tube wall 31.

FIGS. 3 and 4 show a modification of the disintegrator wherein an annular cut may be made especially near the end of the tube 31. In this case, the guide tip 56A is elongated compared to the guide tip 56 in FIG. 1. A metal adapter 107 clamps to the end of the second flexible shaft 23 with an insulating bushing 108 therebetween. The guide tip 56A is threaded at 109 onto the adapter 107 and by this means, different insulating guide tips 56A may be provided to fit closely within different sizes of tubes 31 which are to be disintegrated. This elongated guide tip 56A may then fit inside a portion 31A of the tube 31, which lies within the tube sheet 84. It is this portion 31A of the tube 31 which is to be severed by the disintegrator of this modification.

Flats 110 are provided on the sides of the guide tip 56A to receive the screws 96 of the flexible shaft support 83 in order to fix the position of this guide tip 56A relative to the tube sheet 84. These flats 110 are shown in FIG. 5.

The first flexible shaft 22 has secured thereto, as by welding, a shaft terminator 70 to which an electrode shaft 68A is secured at the threads 71. The electrode 21 is threaded onto the end of the electrode shaft with an insulating depth washer 72 between the electrode 21 and a shoulder on the electrode shaft 68A. The rest of the construction is similar to that in FIG. 1, with the spring 64 urging the electrode shaft 68A toward a radially eccentric position in the radial slot 62. This is better illustrated in FIG. 4.

The operation of this particular modification of FIGS. 3 and 4 is essentially the same as that of FIG. 1. The first flexible shaft 22 is rotated in order to rotate the electrode 21 and to establish disintegrator arcs generally at a location 104 shown in FIG. 4. The further rotation of the second flexible shaft 23 will establish the annular cut portion 105 on the inner wall of the tube 31 toward severance of the tube portion 31A from the main portion of the tube 31. Also, this causes the annular depression 106 on the outer surface of the tube 31, which aids in the severance of this tube portion 31A.

In many cases, it is desirable to remove the tube portion 31A from the tube sheet 84. However, this is often difficult because, in many cases, this tube portion 31A (or at least part of it) has been radially expanded outwardly into tight engagement with the tube sheet 84. It is believed that this radial outward expansion of the tube 31 places the inner wall of the tube in compression in a peripheral direction and places the outer wall of that same tube in tension in a peripheral direction. Then when the annular cut 105 is made to remove most of the inner wall, the outer wall of the tube which has been in tension is permitted to move radially inwardly and relax, thus forming the annular concave depression 106. This same stress condition within the wall of the tube 31 may be caused by drawing the tube through reducing dies to reduce the diameter thereof during manufacture. In any case, it has been observed that this annular concave depression 106 is formed and this is a form of relaxing of the tube wall to permit it to have a slightly smaller outside diameter at this disintegrated cut portion 105.

The present invention also includes a relaxer electrode 131 which may be used with the same tube disintegrator mechanism 11 and may be used as an alternative to the discshaped electrode 21. This relaxer electrode 131 is shown in FIG. 7, and thus the inner wall tube disintegrator 11 is a convertible disintegrator which may disintegrate either an annular portion 105 (see FIG. 3) or an elongated portion 164 at one peripheral position in the tube 31 (see FIGS. 7 and 9).

In order to use the relaxer electrode 131 of FIG. 7, the electrode 21 and insulating washer 72 are removed from the electrode shaft 68A, and the guide tip 56A is removed from the adapter 107 at the threads 109, and are replaced with a tube relaxer 128 which consists of two parts, namely, a relaxer extension 129 shown in FIG. 6 and a relaxer guide 130 shown in FIG. 7. The relaxer extension 129 is made of insulation and threads onto the threads 109 of the adapter 107. The end of the first flexible cable 22 and the shaft terminator 70 with electrode shaft 68A attached are then positioned within the relaxer extension 129. A metal relaxer stem 132 is threaded at 133 onto the electrode shaft 68A. FIG. 7 shows that the relaxer guide 130 is threaded at 134 onto the relaxer extension 129, and this relaxer guide is a hollow insulated member.

An insulated relaxer body 135 has a reduced diameter portion 136 held by a setscrew 137 in the outer end of the relaxer guide 130. This relaxer body 135 may be changed from one job to the next so that the outer end thereof is one which has a diameter closely fitting within the tube inner wall of the tube portion 31A. By this construction, only the relaxer body 135 need be changed for different diameters of tubes 31.

A spring 139 is in an aperture in the relaxer body 135 trapped by the relaxer guide 130, and bears against the relaxer stem 132 to urge it downwardly, as viewed in FIG. 7. Also, a spring 140 is provided in an aperture at the outer end of the relaxer body 135, and is trapped by an insulating sleeve 141 and bears downwardly against a coaxial extension 142 on the relaxer electrode 131. Extension 142 is disposed in a narrow slot 162 for only radial movement. An insulating cap 143 is held by a screw 144 on the end of the relaxer body 135. The full length of the relaxer electrode 131 may have an eccentric portion but, as shown in FIG. 7, only a shorter longitudinal length portion 146 of this electrode 131 is eccentrically disposed relative to the axis 145 of the electrode 131. The length of the eccentric 146 is chosen for the particular job to be accomplished. In FIG. 7, the tube portion 31A is shown as having a rolled section 147 which, up to a shoulder 148, has been rolled or expanded outwardly against the outer support of the tube sheet 84. Because of this outwardly expanded section 147, the tube portion 31A cannot readily be removed from the tube sheet 84. Accordingly, the length of the eccentric portion 146 is made slightly longer than the length of the rolled section 147 in order to be able to relax all of that rolled section 147.

As shown in FIG. 8, the relaxer guide 130 has flats 149 in order to be held by the setscrews 96 in the bushing 93. FIG. 8 shows that the relaxer stem 132 is disposed in a radially directed slot 151, which permits the relaxer stem to be eccentrically disposed.

FIGS. 9 and 10 show that the relaxer electrode 131 is disposed inside an enlarged radial slot 152, which is sufficiently large to take various diameters and various lengths of relaxer electrodes 131.

Operation

The relaxer electrode 131 may be used to relax a tube portion, such as tube portion 31A, which has been radially expanded outwardly to fit tightly within the outer support of the tube sheet 84. Even after the embodiment of FIGS. 1 and 2 or FIGS. 3 to 5 has been used to sever or almost sever an annular portion 105 of the tube 31, this tube portion 31A may not be readily removable. In many cases, such as in boilers wherein a leak may develop in the tube 31, it is desired to plug that portion of the tube 31. To do so, it is desirable to remove the portion 31A so that the capping plug may be inserted directly into the tube sheet 84 rather than into the tube 31 in order to minimize the chances of further leaks. The embodiment of FIGS. 6-11 may be used to relax that portion of the tube 31A so that it may be readily removed from the tube sheet 84.

If the tube inner wall disintegrator 11 has been used in the embodiment of FIGS. 3-5 to sever the annular portion 105, then the guide tip 56A should be removed in order to substitute therefor the tube relaxer 128. To accomplish this, the electrode 21 and insulating washer 72 are removed from the electrode shaft 68A, the threaded cap 66 and spring 64 removed, and then the guide tip 56A unthreaded from the adapter 107 at the threads 109. The relaxer 128 may be assembled in a number of different ways, but one sequence of assembly is to select the proper length of relaxer electrode 131 to have a selected longitudinal length of the eccentric 146 to be longer than the rolled section 147 of the tube portion 31A. This relaxer electrode 131 is threaded onto the relaxer stem 132 at threads 153. Next, the relaxer stem 132 is screwed onto the electrode shaft 68A at the threads 133. Then the relaxer extension 129 may be slid over the electrode 131 and threaded onto the adapter 107 at the threads 109. Next, the relaxer guide 130 may be slid over the relaxer electrode 131 and screwed onto the relaxer extension 129 at the threads 134. Next, the relaxer body 135 may be slid over the electrode 131 and the reduced diameter extension 136 telescoped within the relaxer guide 130. Just before the shoulder 154 hits home, the spring 139 is inserted and trapped within the relaxer guide 130 to urge the relaxer stem 132 downwardly, as viewed in FIGS. 7 and 8. The setscrew 137 may be tightened to secure the relaxer body 135 within the relaxer guide 130. Next, the spring 140 is inserted and depressed as the insulating sleeve 141 is slid over the outer end of the relaxer body 135 and then the insulating washer 143 and screw 144 installed to hold the sleeve 141 in place. The tube relaxer 128 is then ready to be installed through the shaft support 83 and the screws 96 tightened against the flats 149 in order to hold the relaxer body 135 in one rotational position. The clutch 41 is disengaged, and a clamp bar 158 may be moved forwardly to have the nose thereof engage a groove 159 in the bushing 93 (see FIG. 2) and then a screw 160 in an enlarged aperture (not shown) in the clamp bar 158 tightened to prevent rotation of the bushing 93. This establishes the relaxer electrode 131 in only one peripheral position in the tube portion 31A.

Next, the coolant may be turned on at valve 74, the clutch 41 disengaged, the motor 15 started to rotate the first flexible cable 22, and then the disintegrating current applied through the brush 73. The rotation of the relaxer electrode will alternately cause this electrode to make and break physical contact with the inner wall of the tube portion 31A. This will be as shown in FIG. 9, with the springs 139 and 140 urging the relaxer electrode eccentric portion 146 into engagement with the inner tube wall. Further rotation of the electrode will cause the eccentric portion 146 of the electrode to be moved away from the open end of slot 151, the relaxer stem 132 will bottom on the relaxer guide 130, and this will cause arcing as the electrode eccentric 146 breaks physical contact with the inner wall of the tube portion 31A at the trailing edge 166 of the electrode.

FIG. 9 illustrates the action of the electrode eccentric 146 after a short time, e.g., two or three minutes of action. This electrode eccentric 146 has disintegrated an area 164 on the inner tube wall which has a longitudinal length greater than the arcuate extent thereof and which disintegrated area 164 is at only one peripheral position on the inner tube wall. Because the relaxer electrode eccentric 146 is curved or arcuate, the disintegrated area 164 is formed which is arcuate in a direction transverse to the electrode axis 145. This arcuate path is on a radius from the axis 145 of the electrode 131. The electrode may be made from graphite or molybdenum, as examples, and when disintegrating an area 164 in stainless steel tubing, it has been found that the molybdenum electrode does not wear away, as is the usual case, but instead particles of the stainless steel tube adhere to the eccentric 146 to actually build up the trailing edge of this eccentric 146. Thus, this provides improved life to the electrode 131 and this building up of stainless steel particles on the electrode is attributed to the wiping action of the movement of the electrode 131 relative to the tube portion 31A.

When the disintegrated area 164 has reached a depth about as shown in FIG. 9, whereat it has nearly cut through the tube wall, the outer wall of the tube portion 31A at 165 shrinks inwardly as a depressed area, which is longitudinally disposed opposite the disintegrated area 164. This permits a relaxing of the tube portion 31A within the tube sheet 84 so that this severed tube portion 31A may be readily removed from the tube sheet. Again, this relaxing of the tube is not completely understood, but it is believed to be due to the fact that the inner tube wall has been expanded outwardly and hence the inner wall in a peripheral direction is stressed in compression while the outer wall is stressed in tension. As the disintegrated area 164 breaks through the tube wall, or nearly breaks through, the tension at the outer wall causes a shrinking of the tube portion 31A in a peripheral direction so that it is no longer forced outwardly against the tube sheet 84.

Figure 13:
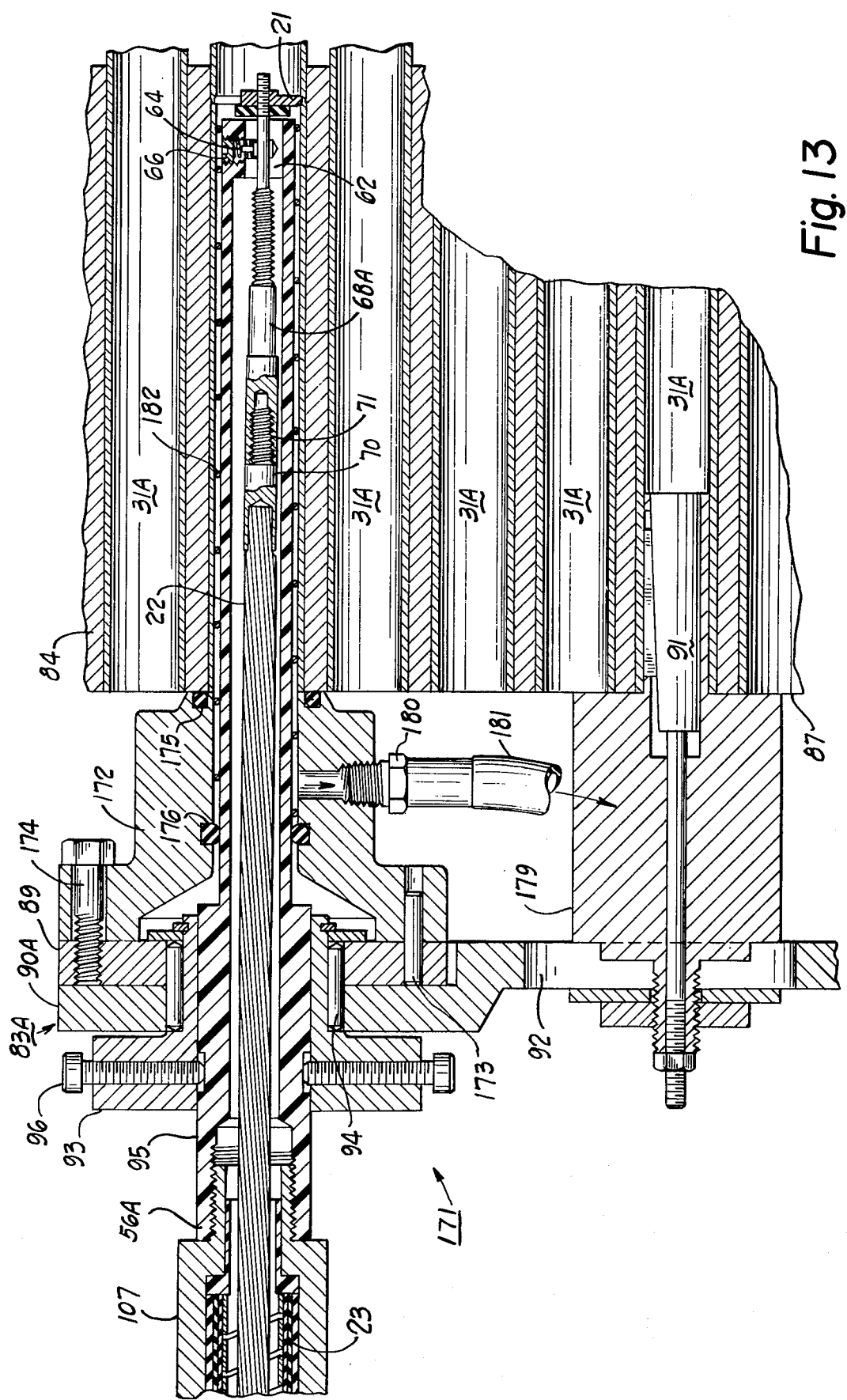
FIG. 13 is an enlarged, longitudinal, sectional view of the modification of FIG. 12.

FIGS. 12 and 13 illustrate a further modification for improved cooling of the disintegrator area 105 or 164. The construction of this internal tube disintegrator 171 is quite similar to that shown in FIGS. 6-11, and the same parts have been illustrated by the same reference numerals. The differences are mainly in the flexible shaft support 83A, which includes a coolant bushing 172 which is located by a pin 173 and held by a screw 174 to the leg 89. This coolant bushing has a seal such as an O-ring seal 175 to seal to the outer surface 87 of the tube sheet 84, and another O-ring seal 176 to seal relative to the guide tip 56A.

The leg 90A is extended, as shown in FIG. 12, and carries a threaded support leg 177 extending through a slot 178. Long shoulders 179 are provided for the support legs 89 and 90A at the expansion bolts 91, so that when this threaded support leg 177 is tightened, the coolant bushing 172 will make a tight seal via the O-ring 175 against the outer face 87 of the tube sheet 84. A coolant fitting 180 is provided laterally in the coolant bushing 172, and communicates with a flexible conduit 181 for transmittal of coolant. In the preferred embodiment, this may be the discharge of coolant, with coolant received as in the previous embodiments in the space between the first and second flexible shafts 22 and 23. In order to aid the return of coolant to the flexible conduit 181, a spring 182 of small diameter wire and wide pitch spacing surrounds the guide tip 56A and has a close sliding fit with the interior of the tube 31A. A suction may be supplied to the conduit 181 to aid in drawing the coolant and chips out of the work area.

The internal tube disintegrator 171 of FIGS. 12 and 13 may operate either with the small disc-shaped electrode 21, as shown in FIG. 13, or with the relaxer electrode 131 of FIG. 7. When utilized with the disc electrode 21, as shown in FIG. 13, the clamp bar 158 will normally be moved outwardly, as shown in FIG. 12, in order to permit rotation of the bushing 93, and hence rotation of the guide tip 56A. Where the tube relaxer 128, relaxer extension 129, and relaxer guide 130 are being used, as in the modification of FIGS. 6-11, the clamp bar 158 is normally tightened into the groove 159 in order to prevent rotation of this tube relaxer 128. In either case, it is possible to use a coolant seal (not shown), but provided just axially inboard of the electrode 21 or insulating washer 143 in order to prevent coolant from moving away, and in fact to retain coolant at the disintegrator electrode. This coolant seal might be a sponge rubber ball, for example, pushed into proper location, and after completion of the disintegrator action, this sponge ball can be blown out of the tube with air pressure from the other end of the tube. With the use of such coolant seal, coolant may flow inwardly in the space between the first and second flexible shafts 22 and 23 to the area of the electrode 21 or 131 to aid in cooling the tube and, more importantly, cooling the electrode, and also to flush out of the way the chips caused by the disintegrator arcing. Again, this may be used with either liquid or gas coolants. Also with the use of such coolant seal, it is possible to have reverse coolant flow, namely, coolant flow inwardly through the conduit 181 and through the space between the guide tip 56A and the tube 31A to the electrode, and then to exhaust this coolant through the space between the first and second flexible shafts 22 and 23.

By this construction of FIGS. 1 and 2, the modification of FIGS. 3-5, the modification of FIGS. 6-11, and the modification of FIGS. 12 and 13, it will be noted that there is a first drive means 29, including the rotation of the first flexible shaft 22, which causes a motion to the electrode toward and away from the inner wall of any said tube which is adapted to periodically draw disintegrator arcs between the electrode and the tube 31. The disintegrator construction in FIGS. 1-5 also provides a second drive means 30 including the second flexible shaft 23, which establishes a second motion of the electrode superimposed upon the first motion and adapted to cause the disintegrator arcs to move in a given arcuate path. This arcuate path may be a full 360 degrees by the structure shown in FIGS. 1-5. This arcuate path has a length substantially longer than any one of the disintegrator arcs. It will also be noted that there is a third motion of the electrode 21 which may be characterized as a "feed motion." This feed motion is a motion of the electrode 21 laterally of the tube axis, and is established by the eccentric slot 62, the spring 64, and by centrifugal force acting on the eccentric weight of the electrode 21. As the electrode cuts deeper into the tube wall, it moves further radially outwardly to continue this cutting until the tube wall has been severed. With the constructions of FIGS. 1-5, the entire tube may be severed into two parts so that the entire tube may be withdrawn from the heat exchanger. Also, small rings or short sections might be cut from the tube as desired. The disintegrator 11 may be used to cut a window in the tube 31. As an example, this window might be cut through the lower portion of the wall of tube 31 to let liquid out of the tube, or it might be cut in the upper portion of the tube wall in order to permit escape of trapped gases. The window may be cut or disintegrated by an electrode similar to the electrode 21 of FIGS. 1 or 3, which will cut a window that is narrow in longitudinal extent, approximating the thickness of the electrode 21, the arcuate extent of the window being dependent upon the eccentric shape of the electrode 21. This window may be cut with the first drive means 29 rotating the electrode 21 and with the second drive means 30 stationary, e.g., by disconnecting the clutch 41. Also, this window may be made of a greater longitudinal extent by utilizing an electrode 21 which is thicker in the longitudinal direction and with the arcing continuing until a window is cut through the wall of the tube.

The electrode 21 will wear, due to the disintegrator arcing, and will need occasional replacement. In order to replace this electrode, setscrews 120 may be tightened onto an ordinarily loose split collar 121 to lock the first flexible cable 22 relative to the second flexible cable 23. Secondly, the plug 38 is removed and the setscrews 37 loosened. Then with loosening of the clamp bolt 54, the fitting 53 may be removed from the metal sleeve 47. Releasing the split bushing 95 at the tube sheet 84 will permit the entire assembly of first and second flexible shafts 22 and 23 to be removed from the interior of the tube 31. The worn electrode 21 may then be replaced with a new one, and the assembly replaced inside the tube. The purpose of the clamp 121 is to make certain that the electrode 21 stays at the same position relative to the end of the guide tip 56, so that one may again be assured that the cutting takes place at the same longitudinal position of the tube 31.

In addition to the first drive means 29 and the second drive means 30, the present invention provides a convertible type of inner wall tube disintegrator wherein a control means is operable alternatively to the second drive means 30 and is cooperable with the first drive means 29. This causes the electrode 131 to have a feed motion radially outwardly in one peripheral area on the tube inner wall, whereby the electrode 131 disintegrates the area 164 on the tube inner wall, which area has a longitudinal length greater than the peripheral extent thereof. This control means includes the disengageable clutch 41 and the clamp bar 158, which retains the electrode 131 in one peripheral position while it is rotating about the axis 145, and also includes the tube relaxer 128 which is used with the disintegrator 11 alternatively to the guide tip 56A. Due to the small diameter of the electrode 131, the arc of the disintegrated area 164 has a radius less than that of the tube inner wall portion 31A. This in effect establishes a rather narrow slot in the tube inner wall as the disintegrator area 164, because it has been found that it is not necessary to disintegrate more than a longitudinal narrow slot in the 360-degree periphery of the tube inner wall for the expanded portion 147 to be able to remove the tube portion 31A from the tube sheet 84.

The insulator guide tip 56, 56A or relaxer body 135 may be made from many different forms of plastic. One suitable form is a hardened plastic, such as a phenolic resin, although it may also be made from nylon or Teflon. Where higher temperatures are expected, and must be resisted, this may be made from glass or ceramic materials.

The various insulating sleeves insulate the electrode mounting means from the tube 31, so that only the electrode 21 or 131 may be that which physically and electrically contacts the tube inner wall. Hence, when the eccentric portion of such electrode rotates to a position out of engagement with the tube inner wall, then a disintegrator arc may be produced by this breaking of the previously established current flow. The control means is operable alternatively to one of the first and second drive means 29 and 30, and, as shown in the preferred embodiments, it is operable alternatively to the second drive means 30, and cooperates with the first drive means 29 to be able to disintegrate the area 164.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An inner wall tube disintegrator comprising, in combination:
   a frame;
   support means on said frame adapted to be longitudinally fixed relative to a tube having a portion to be disintegrated;
   mounting means for mounting a disintegrator electrode relative to said support means and adapted to have the electrode positioned within the tube;
   means to relatively insulate said electrode mounting means from said tube;
   means to supply disintegrator current to said electrode mounting means relative to the tube for disintegrator arcing between the tube and the electrode;
   drive means to establish motion of the electrode laterally toward and away from the inner wall of the tube to intermittently draw disintegrator arcs between the electrode and the inner wall of the tube;
   means separate from said drive means to establish feed movement of the electrode, as the tube wall is disintegrated, toward the remaining portion of the tube wall; and
   means for restricting said intermittent motion to a given transverse path to have the electrode engage the inner wall of the tube at substantially only one arcuate disintegrator area less than 360° of the inner periphery of the tube.

2. A convertible type internal disintegrator for a metal tube inner wall comprising, in combination:
   a frame;
   support means on said frame adpated to be longitudinally fixed relative to a tube having a portion to be disintegrated;
   means for mounting a disintegrator electrode relative to said support means with the electrode adapted to be positioned within the tube;
   means to relatively insulate said electrode mounting means from the tube;
   means to supply disintegrator current to said electrode mounting means relative to the tube for disintegrator arcing between the electrode and the tube inner wall;
   first drive means to establish a first motion of said electrode mounting means relative to said support means whereby an electrode in said electrode mounting means has a first motion alternately toward and away from the inner wall of any said tube to draw disintegrator arcs between the electrode and the tube inner wall;
   second drive means cooperable with said first drive means to cause the electrode mounting means to have a second motion adapted to cause the disintegrator arcs to have an arcuate movement along the inner wall of the tube; and
   control means operable alternatively to one of said first and second drive means and cooperable with the other of said first and second drive means to cause the electrode mounting means to have a feed motion in one area on the tube inner wall periphery, whereby the electrode arc distintegrates an area on the tube inner wall which has a longitudinal length greater than the arcuate extent around the inner periphery thereof.

3. A disintegrator as set forth in claim 2, wherein the electrode usable with said control means has a dimension in the longitudinal direction of the tube greater than its dimension radially of the tube.

4. A disintegrator as set forth in claim 2, wherein said control means is operable alternatively to said second drive means.

5. A disintegrator as set forth in claim 4, wherein the electrode usable with said control means is different from the electrode usable with said second drive means.

6. A disintegrator as set forth in claim 4, wherein said control means cooperable with said first drive means establishes movement of the electrode in an arcuate path in a limited arcuate extent around the inner periphery of the tube inner wall.

7. A disintegrator as set forth in claim 6, wherein said arcuate path establishes a wiping action to wipe disintegrated portions of metal from said disintegrator area to inhibit wear on the electrode.

8. A disintegrator as set forth in claim 6, wherein the electrode usable with said control means has a curved periphery with a radius less than half that of the tube inner wall, and said control means establishing said peripheral area with the contour transverse to the tube axis having a shape closely conforming to the radius of the curved periphery of the electrode.

9. A disintegrator as set forth in claim 8, wherein said first drive means includes a guide having an elongated slot therein and said electrode mounting means extending through said slot.

10. A disintegrator as set forth in claim 9, wherein said guide includes yielding means urging said electrode mounting means in a lateral direction relative to the axis of any said tube.

11. A disintegrator as set forth in claim 4, wherein the electrode includes an eccentric portion adapted to contact the inner wall of any said tube.

12. A disintegrator as set forth in claim 7, including a space between said electrode mounting means and said guide and another space between said guide and the tube to be disintegrated, and
means to supply fluid coolant to one of said spaces.

13. A disintegrator as set forth in claim 12, including suction means to withdraw fluid coolant from the other of said spaces.

14. A disintegrator for an inner wall of a hollow workpiece comprising in combination:
a frame;
support means on said frame adapted to be longitudinally fixed relative to a workpiece having an inner wall portion to be removed;
mounting means for mounting a disintegrator electrode relative to said support means and adapted to have the electrode positioned within the hollow workpiece;
means to relatively insulate said electrode mounting means from said workpiece;
means to supply disintegrator current to said electrode mounting means relative to the workpiece for disintegrator arcing between the workpiece and the electrode;
first drive means to establish a first motion of the electrode mounting means laterally toward and away from the inner wall of any said workpiece to intermittently draw disintegrator arcs between the electrode and any said workpiece inner wall;
second drive means to establish a second motion of the electrode superimposed on said first motion adapted to cause the disintegrator arcs to move in a given path having a length substantially longer than any one of the disintegrator arcs,
means separate from said second drive means to establish feed movements of the electrode laterally toward the workpiece inner wall as the wall is disintegrated; and
said second drive means establishing said given path as at least an arcuate path on the inner wall of the workpiece.

15. A disintegrator as set forth in claim 14, wherein one of said drive means includes a guide movable in a circular arc to guide the electrode in movement establishing said given path.

16. A disintegrator as set forth in claim 15, wherein said guide has an elongated slot therein, and a holder for the electrode extending through said slot.

17. A disintegrator as set forth in claim 15, wherein said guide includes yielding means urging the electrode in a lateral direction relative to the longitudinal axis of any said hollow workpiece.

18. A disintegrator as set forth in cliam 14, wherein one of said drive means moves in a substantially circular arc in a plane substantially perpendicular to the longitudinal axis of the hollow workpiece.

19. A disintegrator as set forth in claim 14, wherein each of said drive means moves in a substantially circular arc in a plane substantially perpendicular to the longitudinal axis of the hollow workpiece.

20. A disintegrator as set forth in claim 14, wherein one of said drive means rotates and the other of said drive means moves at least in a substantially circular arc.

21. A disintegrator as set forth in claim 14, wherein said first drive means includes a first flexible cable having one end connected to be rotated at a location outside the workpiece to be cut and having a second end connected to the electrode to rotate the electrode inside the workpiece to be cut.

22. A disintegrator as set forth in claim 21, wherein the electrode includes an eccentric portion adapted to contact the inner wall of any said workpiece.

23. A disintegrator as set forth in claim 22, wherein said second drive means includes a second flexible cable having one end connected to be arcuately moved at a location outside the workpiece to be cut and having a second end connected to move the electrode in said second motion.

24. A disintegrator as set forth in claim 23, including a guide positioned adjacent the electrode, and said second cable connected to rotate said guide.

25. A disintegrator as set forth in claim 24, including a slot in said guide having an eccentric portion, and said first cable extending through said slot.

26. A disintegrator as set forth in claim 25, including a spring urging said first cable toward the eccentric portion of said slot.

27. An inner wall tube disintegrator comprising, in combination:
a frame;
support means on said frame adapted to be longitudinally fixed relative to a tube having a portion to be disintegrated;
mounting means for mounting a disintegrator electrode relative to said support means and adapted to have the electrode positioned within the tube;
means to relatively insulate said electrode mounting means from said tube;
means to supply disintegrator current to said electrode mounting means relative to the tube for disintegrator arcing between the tube and the electrode;
drive means to establish motion of the electrode laterally toward and away from the inner wall of the tube to intermittently draw disintegrator arcs between the electrode and the inner wall of the tube; and
means for restricting said intermittent motion to a given transverse path to have the electrode engage the inner wall of the tube at substantially only one arcuate disintegrator area less than 360° of the inner periphery of the tube, said drive means and the length of the electrode establishing said disintegrator area on the inner wall of the tube with the longitudinal length exceeding the transverse dimension of said arcuate area.

28. A tube disintegrator as set forth in claim 27, wherein said disintegrator area is elongated longitudinally of the tube and the width thereof is an arc having a radius less than that of the tube inner wall.

29. An inner wall tube disintegrator comprising, in combination:

a frame;

support means on said frame adapted to be longitudinally fixed relative to a tube having a portion to be disintegrated;

mounting means for mounting a disintegrator electrode relative to said support means and adapted to have the electrode positioned within the tube;

means to relatively insulate said electrode mounting means from said tube;

means to supply disintegrator current to said electrode mounting means relative to the tube for disintegrator arcing between the tube and the electrode;

drive means to establish motion of the electrode laterally toward and away from the inner wall of the tube to intermittently draw disintegrator arcs between the electrode and the inner wall of the tube;

means for restricting said intermittent motion to a given transverse path to have the electrode engage the inner wall of the tube at substantially only one arcuate disintegrator area less than 360° of the inner periphery of the tube; and means to establish feed movements of said electrode mounting means laterally toward the tube inner wall as the tube wall is disintegrated.

30. An inner wall tube disintegrator comprising, in combination:

a frame;

support means on said frame adapted to be longitudinally fixed relative to a tube having a portion to be disintegrated;

mounting means for mounting a disintegrator electrode relative to said support means and adapted to have the electrode positioned within the tube;

means to relatively insulate said electrode mounting means from said tube;

means to supply disintegrator current to said electrode mounting means relative to the tube for disintegrator arcing between the tube and the electrode;

drive means to establish motion of the electrode laterally toward and away from the inner wall of the tube to intermittently draw disintegrator arcs between the electrode and the inner wall of the tube; and means for restricting said intermittent motion to a given transverse path to have the electrode engage the inner wall of the tube at substantially only one arcuate disintegrator area less than 360° of the inner periphery of the tube, said drive means and the longitudinal length of the electrode establishing the effective arcing area longitudinal dimension greater than the transverse dimension thereof.

31. An inner wall tube disintegrator comprising, in combination:

a frame;

support means on said frame adapted to be longitudinally fixed relative to a tube having a portion to be disintegrated;

mounting means for mounting a disintegrator electrode relative to said support means and adapted to have the electrode positioned within the tube;

means to relatively insulate said electrode mounting means from said tube;

means to supply disintegrator current to said electrode mounting means relative to the tube for disintegrator arcing between the tube and the electrode;

drive means to establish motion of the electrode laterally toward and away from the inner wall of the tube to intermittently draw disintegrator arcs between the electrode and the inner wall of the tube; and means for restricting said intermittent motion to a given transverse path to have the electrode engage the inner wall of the tube at substantially only one arcuate disintegrator area less than 360° of the inner periphery of the tube, said given transverse path being essentially radial as a feed movement of the electrode to disintegrate a window in the wall of the tube at substantially only one area on the periphery of the inner wall.

32. An inner wall tube disintegrator comprising, in combination:

a frame;

support means on said frame adapted to be longitudinally fixed relative to a tube having a portion to be disintegrated;

mounting means for mounting a disintegrator electrode relative to said support means and adapted to have the electrode positioned within the tube;

means to relatively insulate said electrode mounting means from said tube;

means to supply disintegrator current to said electrode mounting means relative to the tube for disintegrator arcing between the tube and the electrode;

drive means to establish motion of the electrode laterally toward and away from the inner wall of the tube to intermittently draw disintegrator arcs between the electrode and the inner wall of the tube;

means separate from said drive means to establish feed movement of the electrode, as the tube wall is disintegrated, toward the remaining portion of the tube wall;

means for restricting said intermittent motion to a given transverse path to have the electrode engage the inner wall of the tube at substantially only one arcuate disintegrator area less than 360° of the inner periphery of the tube; and means to supply fluid coolant to said disintegrator area.

33. A tube disintegrator as set forth in claim 32, including means to drain fluid coolant from said disintegrator area.

* * * * *